United States Patent [19]

Ueno et al.

[11] Patent Number: 4,741,263
[45] Date of Patent: May 3, 1988

[54] APPARATUS AND METHOD FOR PRODUCING CROISSANTS

[76] Inventors: Sadao Ueno, 636-151, Nagaoka-machi, Utsunomiya-shi, Tochigi-ken; Torahiko Hayashi, 3-4, Nozawa-machi, Utsunomiya-shi, Tochigi-ken, both of Japan

[21] Appl. No.: 867,815

[22] Filed: May 27, 1986

[51] Int. Cl.⁴ .................................................. A21C 3/06
[52] U.S. Cl. ................................. 99/450.2; 99/353; 99/450.1; 425/321; 425/335
[58] Field of Search ................ 99/450.1, 450.2, 450.8, 99/483, 450.7, 516, 352, 353, 355, 356; 426/502, 503, 518; 425/321, 322, 371, 374, 384, 363; 100/118, 151, 153

[56] References Cited

U.S. PATENT DOCUMENTS

| | | | |
|---|---|---|---|
| 2,577,925 | 12/1951 | Sternbach | 99/450.2 |
| 2,682,216 | 6/1954 | Shields | 100/151 |
| 3,473,244 | 10/1969 | Milone et al. | 100/153 |
| 3,704,664 | 12/1972 | Fisher, Jr. | 99/450.2 |
| 4,171,197 | 10/1979 | Sato | 99/353 X |
| 4,241,648 | 12/1980 | Longenecker | 99/349 |
| 4,313,719 | 2/1982 | Lundgren | 100/151 X |
| 4,420,359 | 12/1983 | Goldsworthy | 100/151 X |
| 4,441,408 | 4/1984 | Costa | 99/450.2 |
| 4,656,908 | 4/1987 | Elwood | 99/450.2 |

FOREIGN PATENT DOCUMENTS

| | | | |
|---|---|---|---|
| 2053587 | 4/1971 | France | 99/450.1 |
| 2059858 | 4/1981 | United Kingdom | 99/450.1 |

Primary Examiner—Timothy F. Simone
Attorney, Agent, or Firm—Guy W. Shoup

[57] ABSTRACT

An apparatus and method for producing croissant dough rolls is provided. Dough pieces are fed between two endless belt devices in which the belts move in opposite directions, and rolled up. Means is provided to adjust the gap between the two belts so as to decrease the gap to roll up the forward end of a dough piece and to increase the gap to permit a smooth rolling up direction. A pair of rollers may be provided adjacent the upstream ends of the endless belt devices to hold the dough pieces thereby assisting the belt devices in their effective rolling up operation.

11 Claims, 8 Drawing Sheets

APPARATUS AND METHOD FOR PRODUCING CROISSANTS

BACKGROUND OF THE INVENTION

1. Field of the Invention

The present invention relates to an apparatus and method for producing croissants, and particularly to an apparatus and method for rolling up the forward end of a dough piece to produce croissants.

2. Description of Prior Art

U.S. Pat. No. 3,704,664 teaches an apparatus for forming Swiss rolls, in which apparatus a dough sheet is fed forwardly on a lower conveyor, and the rear end of the dough sheet is lifted upwardly by an upper segment 38 of a lifting means 36, and the lifted rear end of the dough sheet is contacted by a forwardly moving upper conveyor to be curled. The lifting of the rear end of the dough sheet and the winding up of it, however, have not satisfactorily been accomplished, because the rear end of the dough, lifted by the lifting means 36, is caused to contact the belt of an upper or curling conveyor 44 to curl at a high position so that the beginning of the rolling up becomes unstable, and because a relatively wider gap between the upper conveyor and the lower conveyor at their upstream end is arranged to allow the forward moving of the dough sheet while being wound up, resulting in loosely rolled products. Accordingly, there have been produced somewhat inferior products in that they are not tightly wound up or are readily unwound.

SUMMARY OF THE INVENTION

It is an object of the present invention to provide an apparatus and method for producing croissants.

It is another object of the present invention to provide an apparatus and method for producing croissants, by which the forward end of a dough piece is accurately wound up and carried off onto the next station.

It is a further object of the present invention to provide an apparatus and method for producing croissants, by which a dough piece is smoothly rolled up to form a properly shaped croissant.

It is a still further object of the present invention to provide an apparatus and method for producing croissants, by which a dough piece is tightly wound up to form a croissant which hardly loosens in its wound-up form. In one aspect of the present invention, an apparatus for producing croissants is provided, comprising a dough piece rolling up mechanism having a lower endless belt device and an upper endless belt device arranged side by side with and spaced apart from each other, with the belt of the upper endless belt device moving rearwardly and the belt of the lower endless belt device moving forwardly and faster than the belt of the upper endless belt device, characterized by means positioned at the upstream end of the belt device to adjust the gap between the belt devices. In another aspect of the present invention, an apparatus for producing croissants is provided, comprising a dough piece rolling up mechanism having a lower endless belt device and an upper endless belt device arranged side by side with and spaced apart from each other, with the belt of the upper belt device moving rearwardly and the belt of the lower endless belt device moving forwardly and faster than the belt of the upper endless belt device, characterized by means positioned at the upstream end of the belt device to adjust the gap between the belt device and a pair of vertically juxtaposed rollers spaced apart from each other by the thickness or less of the dough piece, to move in the same direction where they face each other, and positioned adjacent the upstream end of the mechanism. In still another aspect of the present invention, a method of producing croissants is provided, comprising feeding dough pieces between two vertically opposed endless belt devices, and rolling up the dough pieces by moving in opposite directions the respective endless belts where they face each other, the belt of the lower endless belt device being moved forwardly and faster than the belt of the upper endless belt device, characterized by decreasing the gap between the upstream ends of the opposed endless belts at the start of the rolling up of the dough piece, and increasing the gap thereafter so as to enable the rolling up and carrying off of the dough piece.

PREFERRED EMBODIMENTS OF THE INVENTION

A first embodiment of the present invention will now be described by reference to the drawings.

Figure 1:
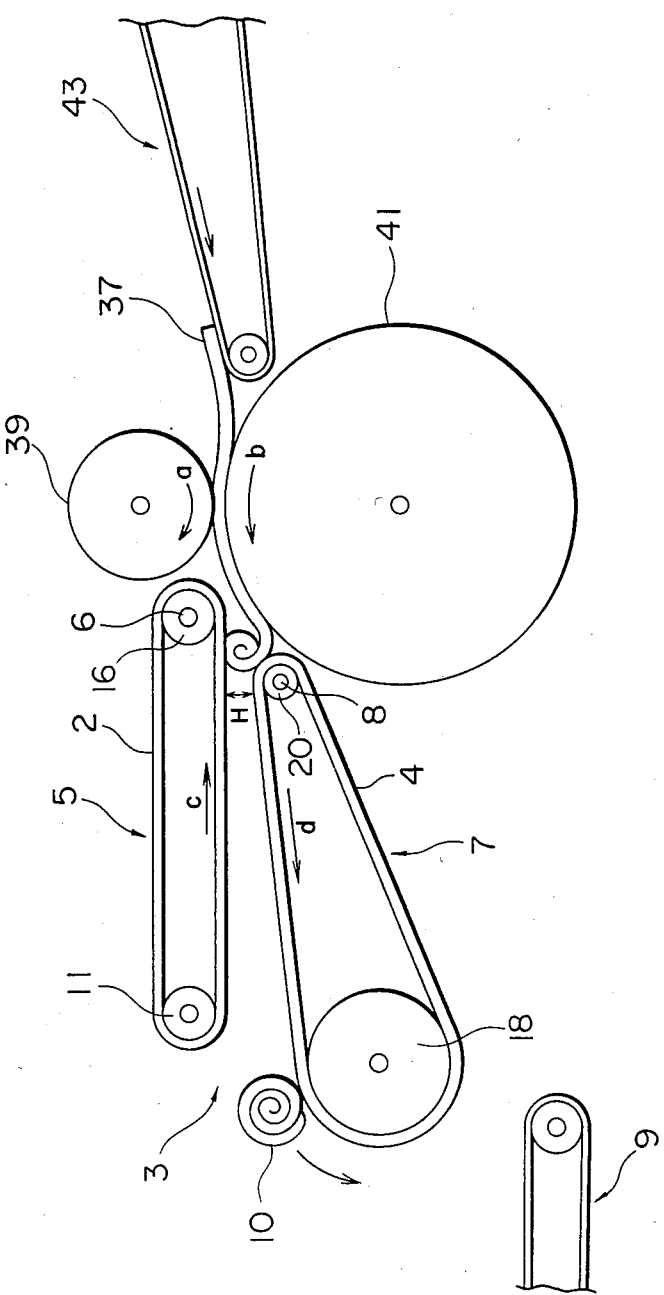
FIG. 1 is a schematic illustration showing the beginning of the rolling up of a dough piece, in a first embodiment of the present invention.

In FIG. 1, a rolling up mechanism 3 comprising a lower endless belt device 7 and an upper endless belt device 5, a pair of vertically juxtaposed rollers 39 and 41, a dough piece feed conveyor 43 (partially shown), a croissant dough feed-out conveyor 9 (partially shown), a dough piece 37, and a croissant dough roll 10 are described. An endless belt 2 is trained over a driven roller 11 and a roller 16 freely rotatable about a shaft 6, and moves in the direction of an arrow c. An endless belt 4 is also trained over a driven roller 18 and a roller 20 freely rotatable about a shaft 8, and moves in the direction of an arrow d. The driven roller 11 and 18 are rotated through a belt or a chain by a respective drive motor of a conventional type (not shown). The conveying speed of each endless belt can be independently controlled by adjusting the rotation of each drive motor. As shown in FIG. 1, the endless belt devices 5 and 7 are arranged side by side with and spaced apart from each other, and the gap between them becomes increasingly larger toward the downstream end of the rolling up mechanism 3. In general, the speed of the belt 4 is adapted to be faster than the speed of the belt 2. For instance, the ratio of the speed of the belt 2 and that of the belt 4 is preferably about 1:2.5. Therefore, a dough piece charged at the upstream end of the mechanism 3 can be transferred toward the downstream end of the mechanism 3 while rolling between the belts. A pair of rollers 39 and 41 are positioned adjacent the upstream end of the mechanism 3, and are vertically juxtaposed and spaced apart from each other by the thickness or less of the dough piece 37. These rollers 39 and 41 are driven through a belt or chain by an independently operable drive motor (not shown). The rollers 39 and 41 can rotate in the same direction where they face each other to move the dough piece 37 toward the rolling up mechanism. The peripheral speed of the roller 41 may be somewhat higher than the speed of the feed conveyor 43 to prevent the dough piece from slackening, which might wrinkle the dough piece. The peripheral speed of the roller 39 may be the same as or preferably be set at about 4 times the peripheral speed of the roller 41, because this arrangement stretches the upper surface of the dough piece 37 relative to the lower surface to cause the dough piece to bend toward the roller 41 thereby attaining the steady contact of the dough piece with the roller 41, and feeding the dough piece accurately at the peripheral speed of the roller 41. If the peripheral speed of the rollers 39 and 41 is the same, the positional relationship of the rollers and the dough piece issuing from the gap between the rollers is liable to be unstable, so that the dough piece cannot be accurately introduced into the rolling up mechanism 3.

The dough piece 37 may be transferred from the feed conveyor 43 through the rollers 39 and 41 to the rolling up mechanism 3. The dough piece 37 issuing from the gap between the rollers 39 and 41 is carried by the roller 41, and reaches the upstream end of the lower endless belt device 7. The tip of the dough piece 37 is first kicked up by the movement of the belt 4 in an upward direction, and is then bent clockwise as seen in FIG. 1. Thus the rolling up of the dough piece begins. The gap between the upstream end of the upper endless belt device and the upstream end of the lower endless belt device is indicated as a distance 11 in FIG. 1, and the relatively short distance H enables the rolling up mechanism 3 to accurately and tightly roll up the dough piece at the beginning of the rolling up operation. The adjustment of the distance H, which is one of the essential concepts of the present invention, will now be described in detail by reference to FIG. 2.

Figure 2:
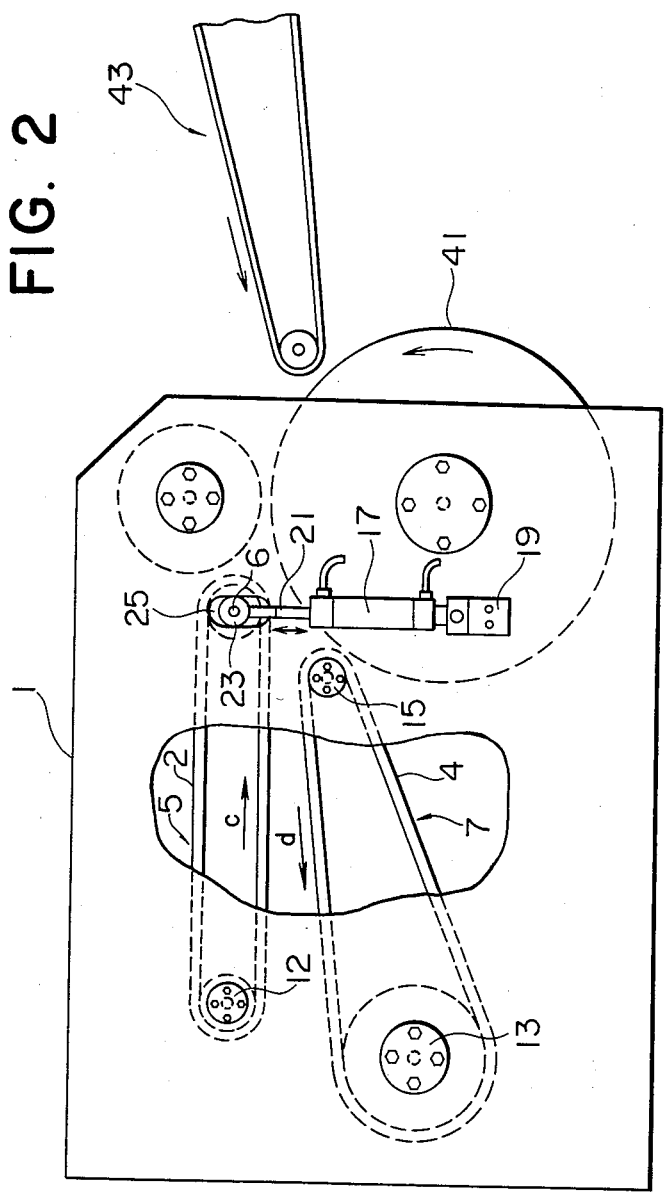
FIG. 2 is a partially cut-away side elevational view of the first embodiment of the present invention.

In FIG. 2, the shafts of the driven rollers 11, 18 and the shaft 8 of the roller 20 are supported in bearing cases respectively, 12, 13, and 15 at both sides of the frame 1. Both ends of the shaft 6 of the roller 16 extend through slots 25 provided through both side walls of the frame 1. Each end of the shaft 6 is fitted in rod ends 23 which are threadedly connected to the rods 21 of air cylinders 17. The air cylinders are mounted on both outer surfaces of the frame 1 by brackets 19. The rods 21 can be reciprocally moved by the air cylinders 17 to allow the shaft 6 to vertically and reciprocally move, so that the distance H can be changed. Although the pair of rollers 39 and 41 are arranged in the above-mentioned embodiment between the rolling up mechanism 3 and the feed conveyor 43, these rollers may be omitted, and the feed conveyor 43 may be arranged adjacent the rolling up mechanism 3 to directly convey the dough piece therefrom to the rolling up mechanism 3, or even the feed conveyor 43 may be omitted when the operator charges dough pieces directly to the rolling up mechanism 3.

The shaft 6 is adapted to be lowered by a predetermined distance to narrow the gap between the upstream ends of the endless belt devices, when the tip of the dough piece reaches the upstream end of the lower endless belt device 7. This lowering of the shaft 6 is conducted by providing a sensor (not shown) to sense the arrival of the tip of the dough piece at a point adjacent the upstream end of the lower endless belt device 7, and a control unit (not shown) to receive signals from the sensor and control the operation of the air cylinders 17.

The dough piece 37 is fed from the feed conveyor 43 through the space between the rollers 39 and 41 and is carried along the periphery of the roller 41. When the tip of the dough piece 37 reaches a point adjacent the upstream end of the lower endless belt device 7, the upper endless belt device 5 descends to narrow the gap between the endless belt devices 5 and 7. The tip of the dough piece 37 is kicked up toward the belt 2 by the movement of the belt 4, and immediately thereafter is caused to be rolled up inwardly. This rolling up of the dough piece 37 produces a croissant dough roll wound up accurately and tightly, provided that the gap between the belt devices is sufficiently adjusted. If the gap is wide, the dough piece would be incompletely rolled up or would not be rolled up. The control unit controls the air cylinders 17 to lift the rods 21 by a predetermined distance after a predetermined time set in the control device has lapsed, thereby increasing the distance H to allow the forward movement of the dough piece while being rolled up inwardly. If no device for adjusting the gap between the two belt devices is provided, the rolled dough piece cannot advance in the rolling up mechanism 3.

The pair of rollers 30 and 41 are spaced apart from each other by the thickness of or preferably a distance slightly less than the thickness of the dough piece 37, and the peripheral speed of the roller 41 is somewhat lower than the speed of the belt 4 of the lower endless belt device 7, because tension is given in the part of the dough piece between its tail where the two rollers 39 and 41 hold it and its forward end where the two belt devices 5 and 7 roll it up. As a result of that, the dough piece can be accurately and tightly rolled up. The applying of the pulling force to the dough piece ceases when the tail of the dough piece leaves the gap between the rollers 39 and 41.

Figure 3:
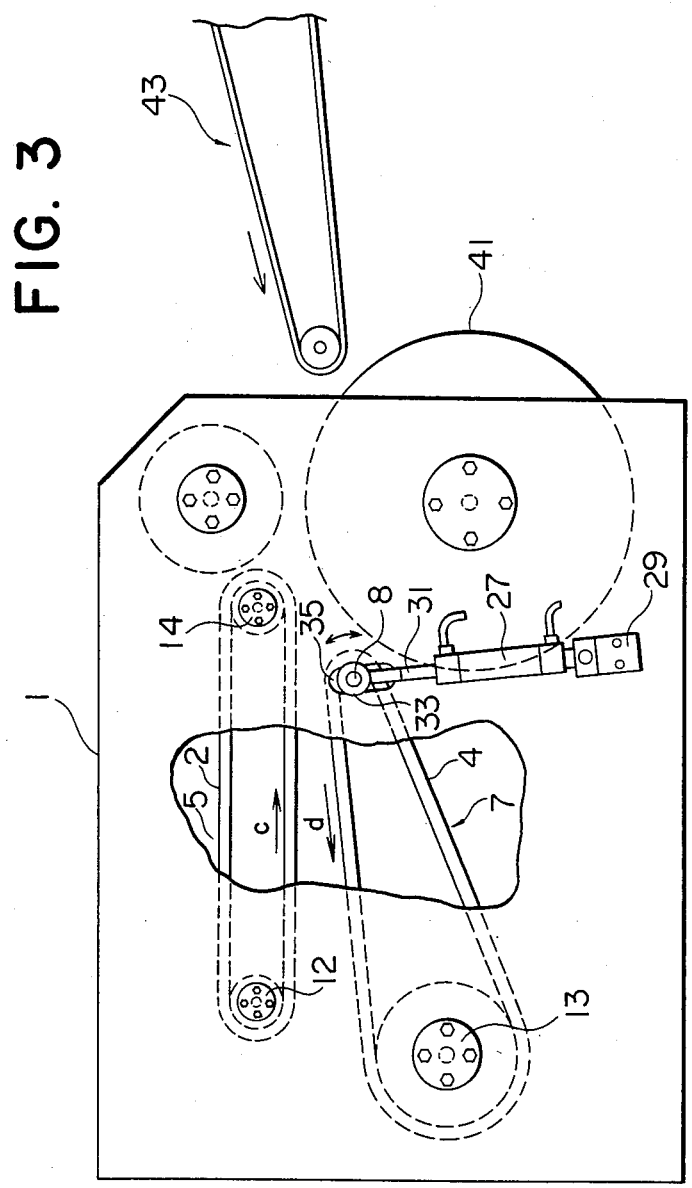
FIG. 3 is a partially cut-away side elevational view of a second embodiment of the present invention.

A second embodiment of the present invention will now be described by reference to FIG. 3, in which both ends of the shaft 8 are fitted in rod ends 33 which are threadedly connected to the rods 31 of air cylinders 27, in the manner similar to the embodiment of FIG. 2. The air cylinders 27 are mounted on both outer surfaces of the frame 1 by brackets 29. Slots 35 are provided through both side walls of the frame 1 to allow the shaft 8 to move vertically and reciprocally. Thus, the distance H is adjusted by lifting or lowering the upstream end of the lower endless belt device 7. The dough piece 37 is fed from the feed conveyor 43 through the gap between the rollers 39 and 41 to the rolling up mechanism 3. When the tip of the dough piece 37 reaches a point adjacent the upstream end of the lower endless belt conveyor 7, the control unit controls the air cylinder 27 by sensing the arrival of the tip of the dough piece, thereby lifting the lower endless belt device 7 to narrow the distance H. The dough piece 37 is thus rolled up between the belts 2 and 4. It increases its diameter to form a croissant dough roll and the upstream end of the lower endless belt device 7 is lowered accordingly.

A third embodiment of the present invention will now be described by reference to FIGS. 4–7, wherein a rolling up mechanism 44 comprises a lower endless belt device 48 and an upper endless belt device 46. A belt 49 is trained over a roller 47 in the upper endless belt device, and a belt 50 is trained over a top shaft 52 having at its periphery a flat portion (see FIG. 6). The top shaft 52 is rotatably mounted at both its ends on a frame 61, and one end of the belt supporting shaft 52 is mounted to an arm 66 having a projection. The projection is pivotally mounted to the rod 64 of an air cylinder 60, which is mounted on the frame 1 through a bracket 62. Bearing cases 51 and 55 support the shaft of the dirven roller and the shaft of the roller of the upper endless belt device 46, respectively. Bearing cases 53 support the shaft of the driven roller of the lower endless belt device 48. A pair of rollers 54 and 56, a feed conveyor 58, and a feedout conveyor 59 are arranged in the same position as that in the first embodiment. The sensor and the control unit (not shown) used in the first embodiment are also employed in this embodiment.

Figure 4:
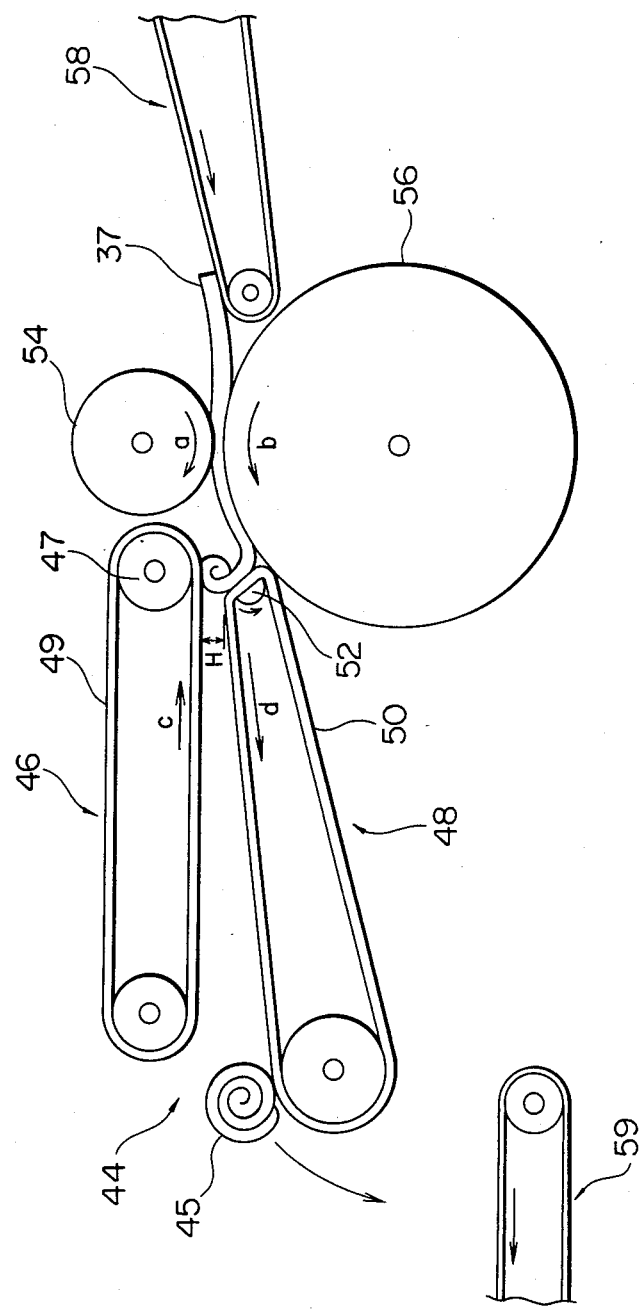
FIG. 4 is a schematic illustration showing the beginning of the rolling up of a dough piece, in a third embodiment of the present invention.
Figure 5:
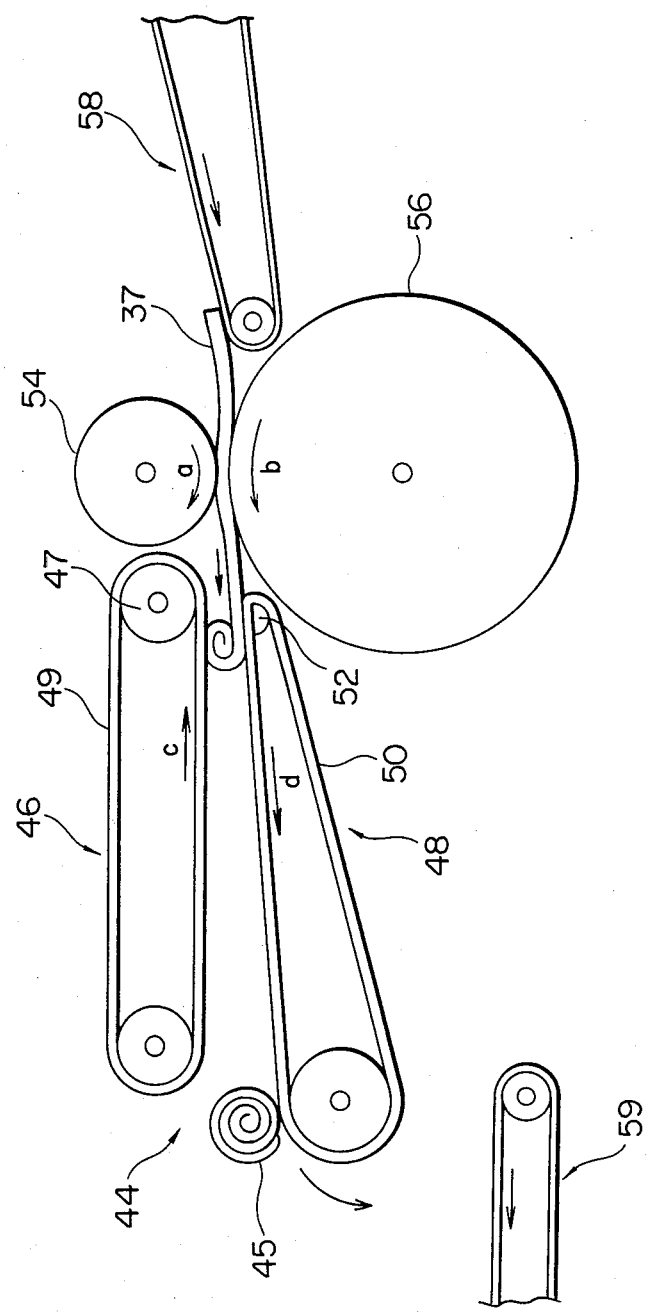
FIG. 5 is a schematic illustration showing the rolling up of a dough piece, in the third embodiment of the present invention.
Figure 6:
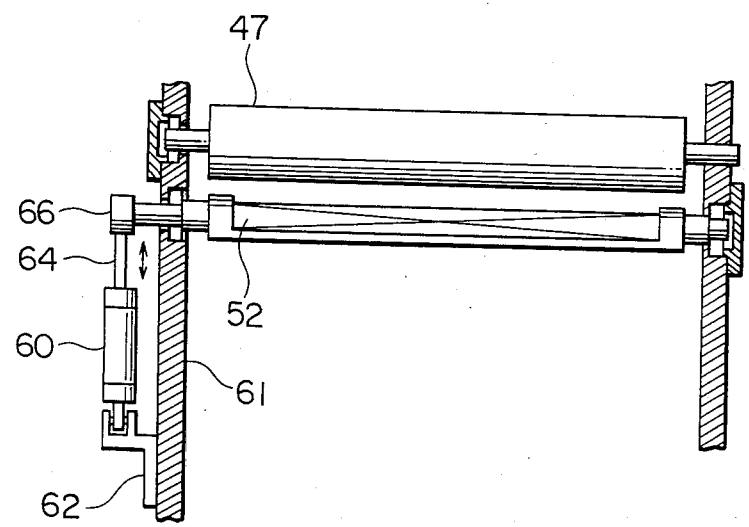
FIG. 6 is a front elevational view, partly in section, principally showing a belt-supporting shaft 52 and related devices of the third embodiment of the present invention.
Figure 7:
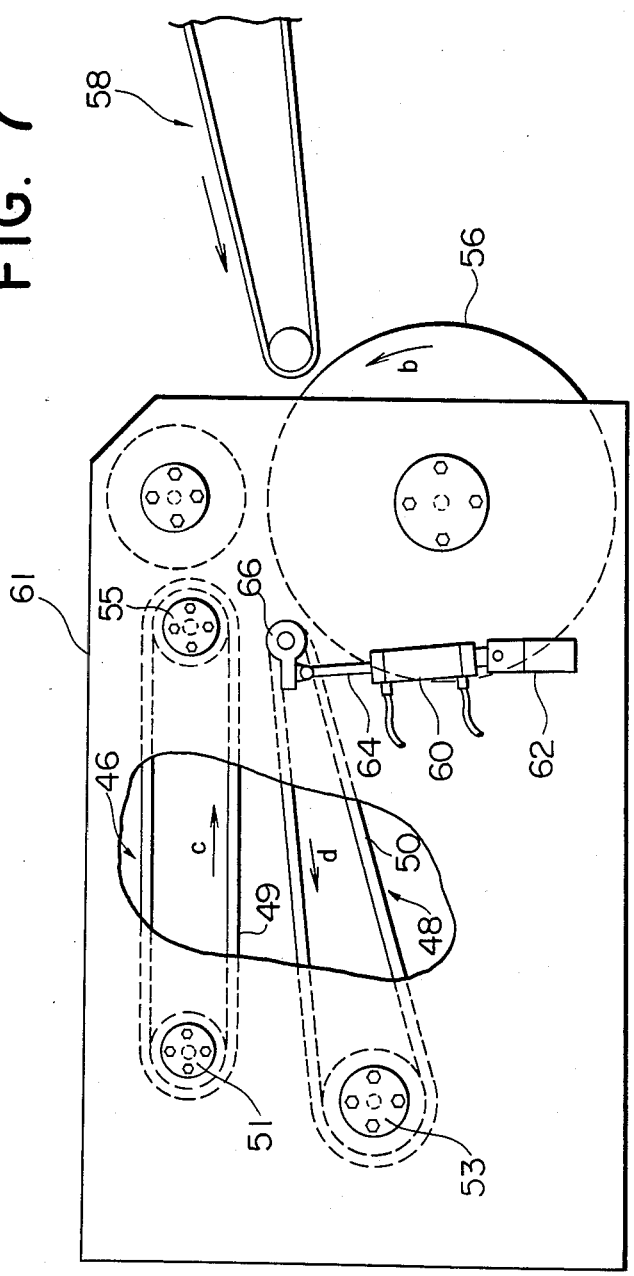
FIG. 7 is a partially cut-away side elevational view of the third embodiment of the present invention.

When the tip of the dough piece 37 is sensed by the sensor, the control unit causes the air cylinder 60 to operate, whereby the rod 64 pushes the projection of the arm 66 to rotate the top shaft 52 about its own axis by a desired angle (see FIG. 4). Thus a slanting straight belt portion is formed at the upstream end of the lower endless belt device 48, and concurrently, the distance H becomes shorter. The dough piece 37 fed from the feed conveyor 58 passes between rollers 54 and 56, and the tip of the dough piece reaches the slanting straight belt portion where the belt 50 is moving upwardly. Therefore, the tip of the dough piece is easily kicked up, and thus the kicked-up tip is immediately bent by the movement of the belt 49, and thereafter rolled up inwardly. The control unit controls the air cylinder 60 to lower the rod 64 by a predetermined distance after a predetermined time set in the control unit has lapsed, by which the belt supporting shaft 52 rotates counterclockwise as seen in FIG. 4 (see an arrow near the top shaft 52 in FIG. 4) about its own axis. The slanting straight belt portion is then aligned with the upper flight of the belt 50 as shown in FIG. 5. The distance H increases accordingly, which allows the advance of the dough piece while being rolled by the belts. The rolled-up dough piece is, then, fed downstream while its diameter increases, and finally becomes a properly rolled-up croissant dough roll 45 and falls to the feed-out conveyor 59. In the third embodiment, the peripheral speed of the roller 54 is higher than that of the roller 56, and the peripheral speed of the roller 56 is somewhat lower than the speed of the belt 50, in the same manner as described in the first embodiment.

Figure 8:
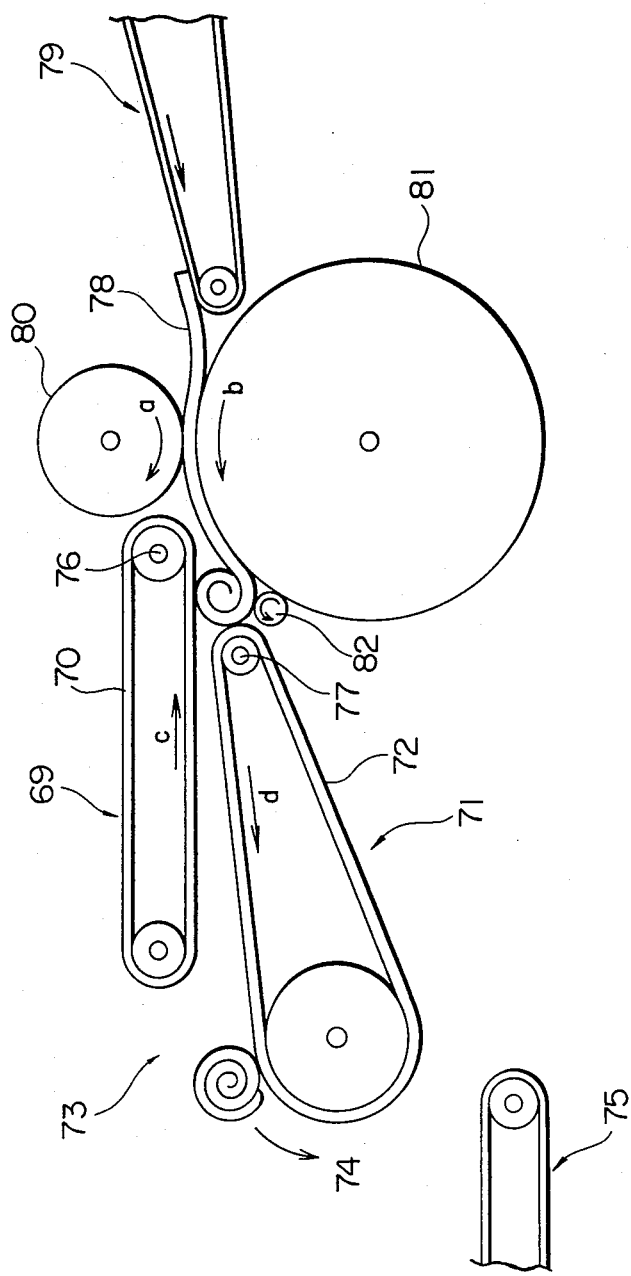
FIG. 8 is a schematic illustration showing the beginning of the rolling up of dough piece in a fourth embodiment of the present invention.

A fourth embodiment of the present invention will now be described by reference to FIG. 8, in which a rolling up mechanism 73 including an upper endless belt device 69 and a lower endless belt device 71, a pair of rollers 80 and 81, a feed conveyor 79, and a feed-out conveyor 75 are arranged in approximately the same position as in FIG. 1. Also, the sensor (not shown) to sense the arrival of the tip of the dough piece and the control unit (not shown) to control the timing of the lifting or lowering the lower endless conveyor and to operate the air cylinder are arranged in the same position as in the first embodiment. The requirements relating to the peripheral speed difference between the rollers 80 and 81, and to the difference between the peripheral speed of the roller 81 and the speed of the belt 72 are the same as in the first embodiment.

A roller 82 of a small diameter is arranged between the roller 81 and the lower endless belt device, and adjacent the peripheral surface of the roller 81. This roller 82 is adapted to rotate at its peripheral speed higher than the peripheral speed of the roller 81 and in the direction of movement of the dough piece. The roller 82 is rotated by a directly coupled motor (not shown) or driven through a belt or chain by a motor (not shown) disposed in a relevant position. In this embodiment, the roller 82 may be rotated in a speed of about 500 to 1000 r.p.m.. The dough piece 78 is fed from the feed conveyor 79 between the rollers 80 and 81, and carried along the periphery of the roller 81, and the tip of the dough piece reaches the roller 82. When the sensor senses the tip of the dough piece, the control unit causes the air cylinder (not shown) to operate thereby lifting or lowering the upstream end of the upper belt device 69 or that of the lower belt device 71, which results in increasing the distance H. The tip of the dough piece is then kicked up by the rotation of the roller 82, and further, kicked up by the movement of the belt 72, so that the tip of the dough piece contacts the belt 70, and is rolled up inwardly. As aforementioned, the roller 82 detaches the tip of the dough piece from the peripheral surface of the roller 81. This action of the roller 82 is especially effective when a dough piece which is liable to adhere to the peripheral surface of the roller 82 is supplied. When a predetermined time set in the control unit has lapsed, the distance H is increased by the control of the control unit, and the rolling up of the dough piece proceeds between the belts 70 and 72 to form the croissant dough roll 74, which falls to the feed-out conveyor 75. The roller 82 may be disposed slightly separated from or in contact with the roller 81.

As will be understood from the description above, the apparatus and method for producing croissants according to the present invention have the following advantages and effects:

First, by providing means to adjust the gap of the rolling up mechanism, the initial rolling or winding up operation is accurate, and the dough piece is smoothly conveyed downstream while being rolled up, thereby increasing its diameter.

Second, by providing a pair of rollers disposed adjacent the upstream end of the rolling up mechanism, the dough piece can be tightly rolled up, and furthermore, since tensile stress in the dough piece generated by the pull still remains after the rolling up operation of the dough piece, the rolled-up dough piece has a tendency to shrink toward the center of the roll. Therefore, the thus formed croissant will not be loosened.

Third, by providing a roller of a small diameter adjacent the rolling up mechanism, the initial rolling up of the dough piece is more accurately and securely made.

We claim:

1. An apparatus for producing croissant dough rolls of a given diameter by rolling up a lengthy dough piece, comprising:
    moving means for moving each dough piece lengthwise from an upstream to a downstream direction, wherein a leading tip of the dough piece moves toward a rolling area;

a rolling mechanism for rolling up the dough piece having a lower endless belt device and an upper endless belt device arranged spaced apart one above the other, wherein the lower endless belt device has a lower belt portion moving from an upstream end in the vicinity of the rolling area to a downstream end in a discharge area, and the upper endless belt device has an upper belt portion moving from an upstream end spaced above the rolling area to a downstream end in the discharge area, said upper and lower belt portions facing each other with a spacing therebetween which gradually increases from their upstream ends spaced apart by a first gap to their downstream ends spaced apart by a larger, second gap;

driving means for driving each of said upper and lower endless belt devices so that the upper and lower belt portions move in the downstream direction, the lower endless belt device being driven at a higher downstream speed than the upper endless belt device; and adjusting means for adjusting the first gap between the upstream ends of the lower and upper endless belt devices in the rolling area, from an intial height to a wider height, in conjunction with rolling each dough piece, whereby the tip of the dough piece entering the rolling area is turned up by moving contact with the upstream end of the lower endless belt device, the tip of the dough piece becomes initially rolled up in the rolling area by moving contact with the lower endless belt device being driven at a higher speed than the upper endless belt device, the initially rolled up tip of the dough piece becomes further rolled up to an increasingly larger diameter by the adjusting of the first gap to the wider height by the adjusting means, and the further rolled up dough piece then becomes conveyed downstream between the lower and upper belt portions while being rolled up by their different downstream speeds to an increasingly larger diameter until the given diameter of the rolled up croissant dough roll is attained toward the discharge area.

2. An apparatus of claim 1, wherein the means to adjust the gap consists of lifting means for lifting and lowering the upstream end of the upper endless belt device.

3. An apparatus of claim 1, wherein the means to adjust the gap consist of lifting means for lifting and lowering the upstream end of the lower endless belt device.

4. An apparatus of claim 1, wherein the means to adjust the gap comprises a shaft supporting the upstream end of the lower endless belt device and having at its periphery a flat portion, and further comprises means to rotate the shaft about its axis thereby adjusting the angle of the flat portion relative to the upper flight of the belt.

5. An apparatus of claim 1, wherein said moving means includes a pair of vertically juxtaposed upper and lower rollers spaced apart from each other by a given thickness for the dough piece, the rollers being positioned adjacent the upstream ends of the endless belt devices and driven at respective peripheral speeds for moving the dough piece in the downstream direction into the rolling area.

6. An apparatus of claim 5, wherein the means to adjust the gap consists of lifting means for lifting and lowering the upstream end of the upper endless belt device.

7. An apparatus of claim 5, wherein the means to adjust the gap consists of lifting means for lifting and lowering the upstream end of the lower endless belt device.

8. An apparatus of claim 5, wherein the means to adjust the gap comprises a shaft supporting the lower endless belt device and having at its periphery a flat portion, and further comprises means to rotate the shaft about its axis, thereby adjusting the angle of the flat portion relative to the upper flight of the belt.

9. An apparatus of claim 5, wherein the peripheral speed of the upper roller is higher than the peripheral speed of the lower roller.

10. An apparatus of claim 5, wherein the peripheral speed of the lower roller is slower than the speed of the belt of the lower endless belt device.

11. An apparatus of claim 5, further comprising a roller of a small diameter positioned between the lower roller of the juxtaposed rollers and the upstream end of the lower endless belt device, the roller of a small diameter being adjacent the peripheral surface of the lower roller, and being rotated in the direction of movement of the dough piece and faster in its peripheral speed than the peripheral speed of the lower roller.

* * * * *